Patented Mar. 7, 1933

1,900,383

UNITED STATES PATENT OFFICE

ALPHONS O. JAEGER, OF MOUNT LEBANON, PENNSYLVANIA, ASSIGNOR TO THE SELDEN COMPANY, OF PITTSBURGH, PENNSYLVANIA, A CORPORATION OF DELAWARE

CONTACT SULPHURIC ACID PROCESS

No Drawing. Application filed June 1, 1931. Serial No. 541,328.

This invention relates to the catalytic oxidation of sulphur dioxide to sulphur trioxide, the contact sulphuric acid process, by means of a new class of catalysts.

It has been proposed to use silver vanadate as a catalyst for the contact sulphuric acid process, the catalyst being supported on asbestos as in the Knietsch platinum contact mass. This catalyst gives yields up to 97% at light loadings, although the yield drops sharply as shown by Waeser in his "Handbuch der Schwefelsaurefabrikation", Vol. III, pages 1473-1474, when commercial loadings are attempted. For this reason silver vanadate, although more reactive as a sulphuric acid catalyst than many other simple salts of vanadium, has never been used commercially for the contact sulphuric acid process.

I have now found that yields as high or higher than those obtainable with commercial platinum catalysts can be obtained by the use of silver-vanadium catalysts when these catalysts are associated with stabilizers, that is to say with compounds of the alkali or alkaline earth metals. Not only are stabilized catalysts containing silver and vanadium capable of giving higher yields than those without stabilizers, but these high yields are maintained under much heavier loadings and for longer periods of time. The reason for this unexpected increase in activity has not as yet been definitely determined, but I am at present of the opinion that the alkali-forming metal enters into some sort of a loose chemical combination with the vanadium-oxygen radical and thus increases its activity. The invention is not limited, however, to any theory of action of the stabilized silver-vanadium catalysts, and the results obtained may be due in part or wholly to other causes.

Although the presence of compounds of any of the alkali-forming metals serves to improve the action of silver-vanadium catalysts and especially of silver vanadate in the contact sulphuric acid process, I have further discovered that compounds of metals of the alkaline earth group, which for purposes of the present invention includes beryllium and magnesium as well as calcium, barium and strontium, are particularly favorable, and that the action of the oxides, hydroxides and salts of calcium are especially beneficial. This fact is also surprising, for the alkali metal stabilizers and particularly potassium and sodium compounds have given the best results with other vanadium catalysts in the oxidation of sulphur dioxide, particularly in the case of the permutogenetic catalysts containing vanadium which are the most active sulphuric acid catalysts known. Of the calcium compounds, the oxide and hydroxide have shown themselves to be slightly superior in use to the salts of calcium.

The uniformity of action of the stabilized silver-vanadium catalysts of the present invention may be further enhanced, if desired, by the incorporation of additional stabilizer promoters such as compounds of aluminum, zinc, cadmium, copper and metals of the 4th to the 8th groups of the periodic system which are not specific catalysts for the oxidation of sulfur dioxide. These stabilizer promoters may be admixed with the silver-vanadium catalysts and supported upon carriers or they may be incorporated into the body of an artificially preformed carrier pellet as described in my co-pending application Serial No. 526,133, filed March 28, 1931, which is then coated with the silver vanadate or other silver-vanadium compound or mixture, stabilized with alkali or alkaline earth metal compounds or mixtures of these. The stabilizer itself may also be incorporated, in whole or in part, within the body of the synthetic pellet and in many cases this is an advantage since it permits the use of alkali-forming metal salts of the metallates to be used as combined stabilizers and stabilizer promoters.

The stabilized catalysts of the present invention may also be impregnated into or supported upon the surface of fragments of diatomite brick in the manner described in my co-pending application Serial No. 541,118, filed May 29, 1931.

Such impregnated or coated catalysts have a naturally high physical and chemical activity by reason of the finely porous structure and activating influence of the silicious brick material.

The present invention is not limited to any definite ratio between the amounts of silver, vanadium and stabilizer. I have found, however, that there are certain definite proportions of these materials which produce better results than others, and the use of catalysts proportioned in this manner is included as a further specific feature of the invention. For example, I have found that stabilizers of the alkaline earth metal group are most effective when the molecular ratio $MeO:2V_2O_5$ is maintained whereas with the alkali metal compounds the ratio $Me_2O:4V_2O_5$ gives best results. Similarly, smaller amounts of silver than those present in silver vanadate may be used with good results at loadings up to 80 liters per hour per 200 cc. catalyst when the normal amount of stabilizer is present, but with higher gas speeds the yields tend to fall off unless the percentage of silver is increased.

The catalysts of the present invention have been found to produce good results irrespective of the valency which the vanadium may exhibit in the catalyst as originally prepared. As is well known, vanadium combines with valences of 2, 3, 4 and 5, and acts as an acid forming substance with each of the three higher valences. According to the results of many investigators, the chief catalytic action of vanadium is due to its fluctuation between lower and higher valences and I have found that, in a similar manner, any suitable compound which contains both silver and vanadium will function as a catalyst for the contact sulfuric acid process in accordance with the present invention and catalysts containing compounds of silver and vanadium in its tri, tetra, or pentavalent form are all included.

The invention will be further described in connection with the following examples, which are for illustrative purposes, and to which it is not limited.

Example 1

An unstabilized silver vanadate catalyst is prepared by precipitating 32 grams ammonium metavanadate, dissolved in 500 cc. water, with a solution of 48 grams silver nitrate, dissolving the washed precipitate by the addition of ammonium hydroxide, and spraying on 500 cc. of heated "silocel C-22" of 5-8 mesh. 200 cc. of this catalyst are tested in the usual manner with 7% burner gases at temperatures of 500-425° C. with the following results:

| Loadings, liters/hr | 50 | 80 | 135 | 150 |
|---|---|---|---|---|
| Per cent conversion | 96.1-96.5 | 96.3-97.1 | 81.5-84.9 | 76.2-77.2 |

A catalyst similar to the first but stabilized with alkali metal is prepared as follows.

16 grams ammonium vanadate dissolved in 200 cc. of water are treated with 1.5 grams 90% sodium hydroxide and the solution coated upon 250 cc. "silocel C-22" of 5-8 mesh. The carrier is then coated with a solution of 24 grams silver nitrate in 100 cc. of water and heated in air for a short time. When tested under the conditions outlined above, 200 cc. of this catalyst produce the following results:

| Loadings, liters/hr | 50 | 80 | 135 | 150 |
|---|---|---|---|---|
| Per cent conversion | 98.4-98.5 | 97.6-98.2 | 94.4-95.3 | 80.0-85.0 |

The above example shows, by a direct comparison, that marked improvements in yield, particularly under higher loadings, are obtained when silver-vanadium catalysts are used with stabilizers.

Example 2

250 parts by volume of "silocel C-22" of 5-8 mesh are coated with calcium nitrate, obtained by treating a suspension of 4.5 parts by weight $CaCO_3$ in 100 parts water with nitric acid until no more carbon dioxide is given off and with a solution of 24 grams silver nitrate. The carrier is then coated with a solution containing 16 parts by weight of ammonium metavanadate in 250 parts water and the catalyst calcined in air at 200-250° C.

200 cc. of the contact mass so obtained, when tested with 7% burner gases under heavy loadings give the following results:

| Loadings, liters/hr | 135 | 150 | 185 |
|---|---|---|---|
| Per cent conversion | 97.5 | 97.1 | 95.5 |

It will thus be seen that with a calcium hydroxide stabilizer a catalyst containing silver and vanadium will produce commercial yields at loadings far in excess of those which can be obtained with unstabilized silver vanadate catalysts.

Example 3

A contact mass containing magnesium, silver and vanadium in the ratio $$MgO:Ag_2O:V_2O_5 = \tfrac{1}{2}:1:1$$

is prepared by coating 250 parts by volume of "silocel C-22" of 6-8 mesh with a solution containing magnesium sulfate, prepared by treating 4.1 parts by weight $MgCO_3$ suspended in 100 parts distilled water and neutralized with sulphuric acid and 24 parts silver nitrate with the addition of another 100 parts water. The carrier is then heated and sprayed with a solution of 16 parts by weight of ammonium metavanadate in 250 parts water and after calcination is ready for use.

When tested with 7% burner gases the following results are obtained:

| Loadings, liters/hr | 80 | 135 | 150 |
|---|---|---|---|
| Per cent conversion | 97.8 | 95.6 | 95.0 |

The above test shows that this catalyst also gives commercial yields at loadings in excess of those which are normal for commercially used platinum catalysts.

Example 4

6.5 parts by weight of Bé.$(NO_3)_2.3H_2O$ and 24 parts $AgNO_3$ are dissolved in 250 parts distilled water with the addition of a few drops $HNO_3$ to prevent hydrolysis. The solution is sprayed onto 250 parts by volume of "silocel C-3" of 6–8 mesh, care being taken to preserve a uniform coating. The coated silocel is then sprayed with a solution of 16 parts $NH_4VO_3$ in 250 parts boiling water and after calcination with air and dilute $SO_2$ gases at 250–300° C. the catalyst is ready for use.

When tested with 7–7.5% burner gases the following results are obtained.

| Loadings, liter/hr | 80 | 135 | 150 |
|---|---|---|---|
| Per cent conversion | 97.2 | 96.4 | 94.0 |

In the specification and claims the term "alkali forming metal" is used as a generic term to include metals of the alkali and alkaline earth metal groups.

What is claimed as new is:

1. A process of oxidizing sulphur dioxide to sulphur trioxide, which comprises bringing about reaction between sulphur dioxide and oxygen containing gases in the presence of a catalyst containing diatomite brick fragments with which are associated silver in chemical combination, vanadium in chemical combination and an alkali-forming metal in chemical combination.

2. A process of oxidizing sulphur dioxide to sulphur trioxide, which comprises bringing about reaction between sulphur dioxide and oxygen containing gases in the presence of a catalyst containing diatomite brick fragments with which are associated silver and vanadium in chemical combination and at least one compound of an alkali-forming metal.

3. A process of oxidizing sulphur dioxide to sulphur trioxide, which comprises bringing about reaction between sulphur dioxide and oxygen containing gases in the presence of a catalyst containing silver in chemical combination, vanadium in chemical combination and at least one compound of an alkaline earth metal, present in amounts not materially different from the ratio $MeO:2V_2O_5$.

4. A process of oxidizing sulphur dioxide to sulphur trioxide, which comprises bringing about reaction between sulphur dioxide and oxygen containing gases in the presence of a catalyst containing silver in chemical combination, vanadium in chemical combination and at least one compound of an alkali metal present in amounts not materially different from the ratio $Me_2O:4V_2O_5$.

5. A process of oxidizing sulphur dioxide to sulphur trioxide, which comprises bringing about reaction between sulphur dioxide and oxygen containing gases in the presence of a catalyst containing a carrier with which is associated silver in chemical combination, vanadium in chemical combination and at least one compound of an alkaline earth metal, present in amounts not materially different from the ratio $MeO:2V_2O_5$.

6. A process of oxidizing sulphur dioxide to sulphur trioxide, which comprises bringing about reaction between sulphur dioxide and oxygen containing gases in the presence of a catalyst containing a carrier with which is associated silver in chemical combination, vanadium in chemical combination and at least one compound of an alkali metal present in amounts not materially different from the ratio $Me_2O:4V_2O_5$.

7. A process of oxidizing sulphur dioxide to sulphur trioxide, which comprises bringing about reaction between sulphur dioxide and oxygen containing gases in the presence of a catalyst containing diatomite brick fragments with which are associated silver in chemical combination, vanadium in chemical combination and at least one compound of an alkaline earth metal, present in amounts not materially different from the ratio $MeO:2V_2O_5$.

8. A process of oxidizing sulphur dioxide to sulphur trioxide, which comprises bringing about reaction between sulphur dioxide and oxygen containing gases in the presence of a catalyst containing diatomite brick fragments with which are associated silver in chemical combination, vanadium in chemical combination and at least one compound of an alkali metal present in amounts not materially different from the ratio $Me_2O:4V_2O_5$.

Signed at Pittsburgh, Pennsylvania this 29th day of May 1931.

ALPHONS O. JAEGER.